United States Patent [19]
Crosman

[11] Patent Number: 5,503,659
[45] Date of Patent: Apr. 2, 1996

[54] VENTGUARD

[76] Inventor: Jay C. Crosman, 29 Petersville Rd., New Rochelle, N.Y. 10801

[21] Appl. No.: 316,988

[22] Filed: Aug. 11, 1994

[51] Int. Cl.$^6$ .................................................. B01D 37/00
[52] U.S. Cl. ............................... 95/143; 95/273; 96/108; 96/142; 220/371; 220/745
[58] Field of Search ........................... 95/143, 146, 273, 95/901, 286; 96/108, 127, 142; 137/587; 220/371, 745

[56] References Cited

U.S. PATENT DOCUMENTS

| | | | |
|---|---|---|---|
| 1,439,451 | 12/1922 | Seibert et al. | 95/143 |
| 3,445,194 | 5/1969 | Thomas et al. | 96/127 |
| 4,018,568 | 4/1977 | Brewer | 96/127 |
| 4,091,643 | 5/1978 | Zucchini | 96/108 |
| 4,995,890 | 2/1991 | Croudace | 96/127 |
| 5,160,515 | 11/1992 | Nelson et al. | 220/745 |
| 5,220,799 | 6/1993 | Lievens et al. | 95/273 |

FOREIGN PATENT DOCUMENTS

| | | | |
|---|---|---|---|
| 2532618 | 12/1976 | Germany | 95/143 |
| 1738722 | 6/1992 | U.S.S.R. | 220/745 |
| 9414707 | 7/1994 | WIPO | 96/108 |

Primary Examiner—C. Scott Bushey

[57] ABSTRACT

This invention is a system which purifies or removes air pollutants from the vent gas stream of a fixed roof liquid storage tank. It incorporates a novel method for insuring that tank venting will not be restricted or prevented by the air pollution control or purification devices, and thereby eliminates a potential cause of deformation or collapse of a fixed roof liquid storage tank upon which it may be installed. It is constructed of essentially two parts as follows:

1. a purification unit, which may contain filtration and/or sorptive media, connected by a pipe or chamber to the vent connection of a fixed roof liquid storage tank
2. a forced draft fan, selected according to specific design criteria, which forces air into the pipe or chamber which connects the purification unit and the fixed roof liquid storage tank.

4 Claims, 6 Drawing Sheets

VENTGUARD

BACKGROUND OF THE INVENTION

Previous to this invention, a company which manufactured industrial filtration and sorptive media products, had discussions with a potential customer who wished to reduce odor emissions from the vents of several large fixed roof oil storage tanks. Odors caused by gases escaping from the vent lines of these tanks had resulted in complaints from the surrounding community.

It was known that purification units employing adsorptive granular activated carbon media would remove a large portion of the odor causing gases. However, the customer was concerned about the possibility of damaging the tanks because he had heard about an incident where a similar purification unit had caused the collapse of a large oil storage tank.

DESCRIPTION OF THE PRIOR ART

Mechanical deformation of the storage tanks (30) could occur if media in the purification unit (20) became clogged, or for any reason restricted the free flow of gases between the inside space of the tank and the surrounding atmosphere. If the free flow of gases is restricted when the tank is being filled with liquid, gas pressure in the tank (Pt) will be greater than the pressure of the surrounding atmosphere (Pa). This will create forces which are exerted on the tank walls and roof in an outward direction as shown on FIG. 1. If the free flow of gases is restricted when liquid is pumped out of the tank, gas pressure in the tank (Pt) will be less than the pressure of the surrounding atmosphere (Pa). This will create forces which act on the tank roof and walls in an inward direction as shown on FIG. 2.

Calculations were performed to determine what pressure difference could be tolerated by the oil storage tanks under consideration. It was found that (Pt) could be greater than (Pa) by as much as about 4 inches w.c. (water column), but (Pt) could not be less than (Pa) by any more than about 0.01 inches w.c.. Otherwise, mechanical deformation of the storage tanks would occur. In other words, the storage tanks could tolerate some positive internal pressure, but almost no negative internal pressure, and these findings confirmed the results of the customer's own independent calculations. Therefore many fixed roof liquid storage tanks are vulnerable to small differences between internal and external gas pressures and this vulnerability is much greater with respect to conditions where the storage tank internal pressure could be less than the surrounding atmosphere.

Based upon the best methods known at the time (fall of 1990), the customer purchased and installed units, which are shown schematically in FIG. 3. In case the granular activated carbon (10) became clogged, a vacuum breaker (11) would prevent (Pt) from becoming too much smaller than (Pa), and if (Pt) became larger than (Pa), gases inside the tank (30) would force open the water loop seal (12), escape to the atmosphere, and equalize internal and external pressures.

Another commercially available unit is shown in FIG. 4. It includes a rupture disc (13) to equalize pressure inside the storage tank (30) with that of the surrounding atmosphere in the event that the media (10) became clogged. This unit was offered by Calgon Corporation under the tradename "Ventsorb", and is schematically shown in FIG. 4.

With either of these systems, a possibility remains that a storage tank could be damaged if the granular activated carbon became clogged. Neither a vacuum breaker nor a rupture disc is sensitive enough to prevent more than 0.01 inches w.c. negative pressure within the storage tank. It is also possible that a vacuum breaker valve could become frozen shut.

SUMMARY OF THE INVENTION

It is an object of the invention to insure that a fixed roof liquid storage tank will not collapse or be otherwise mechanically deformed as a result of the installation of air pollution control, purification, or odor control units containing filtration and/or sorptive media on the vent line of that tank.

It is a further object of the invention to provide a means for retrofitting air pollution control, purification, or odor control devices onto the vent lines of existing fixed roof liquid storage tanks.

When a new liquid storage tank is to be constructed and a component or components of the gas atmosphere above the stored liquid are to be prevented from escaping to the atmosphere, it is an object of the invention to provide a viable method for accomplishing this with a fixed roof storage tank. A fixed roof storage tank would then become a viable alternative to a floating roof storage tank, which also prevents vent gases from escaping to the atmosphere.

DETAILED DESCRIPTION OF THE PREFERRED EMBODIMENTS

Figure 1:
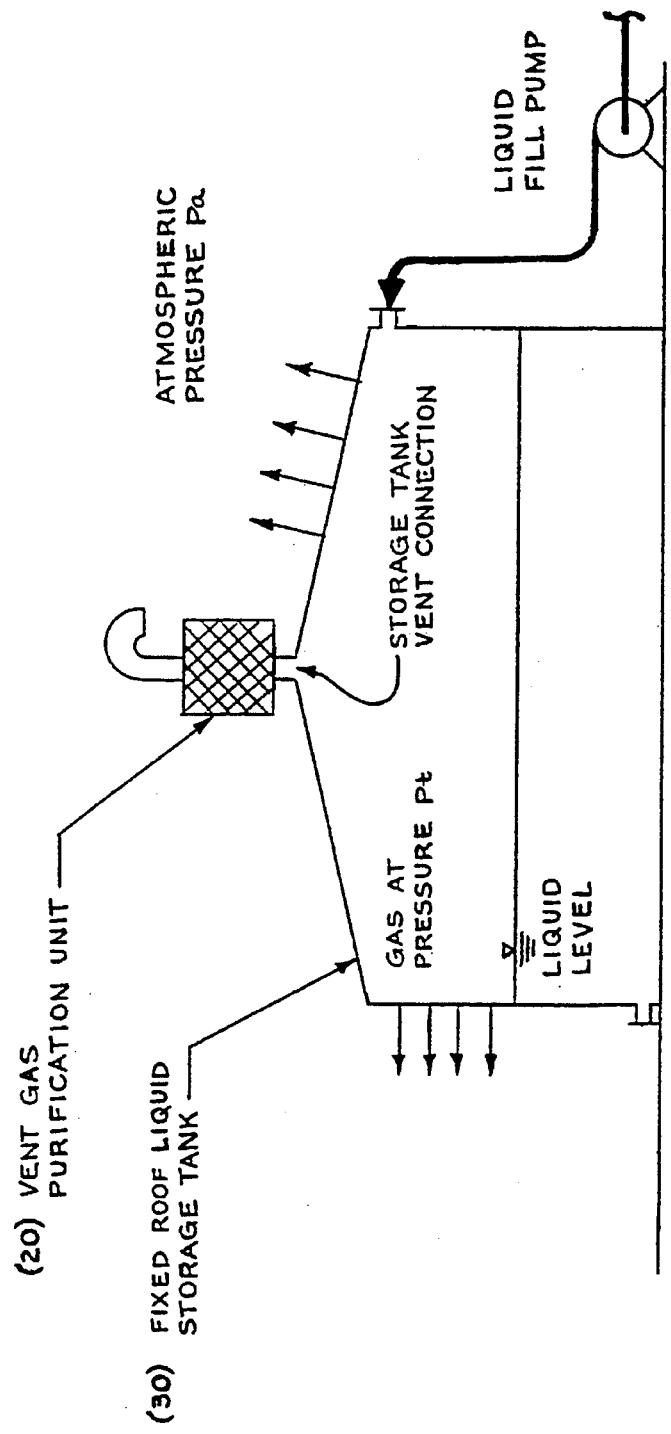
FIG. 1 illustrates the forces acting upon a fixed roof liquid storage tank with a prior art purification unit attached to the gas vent during liquid filling of the tank.
Figure 2:
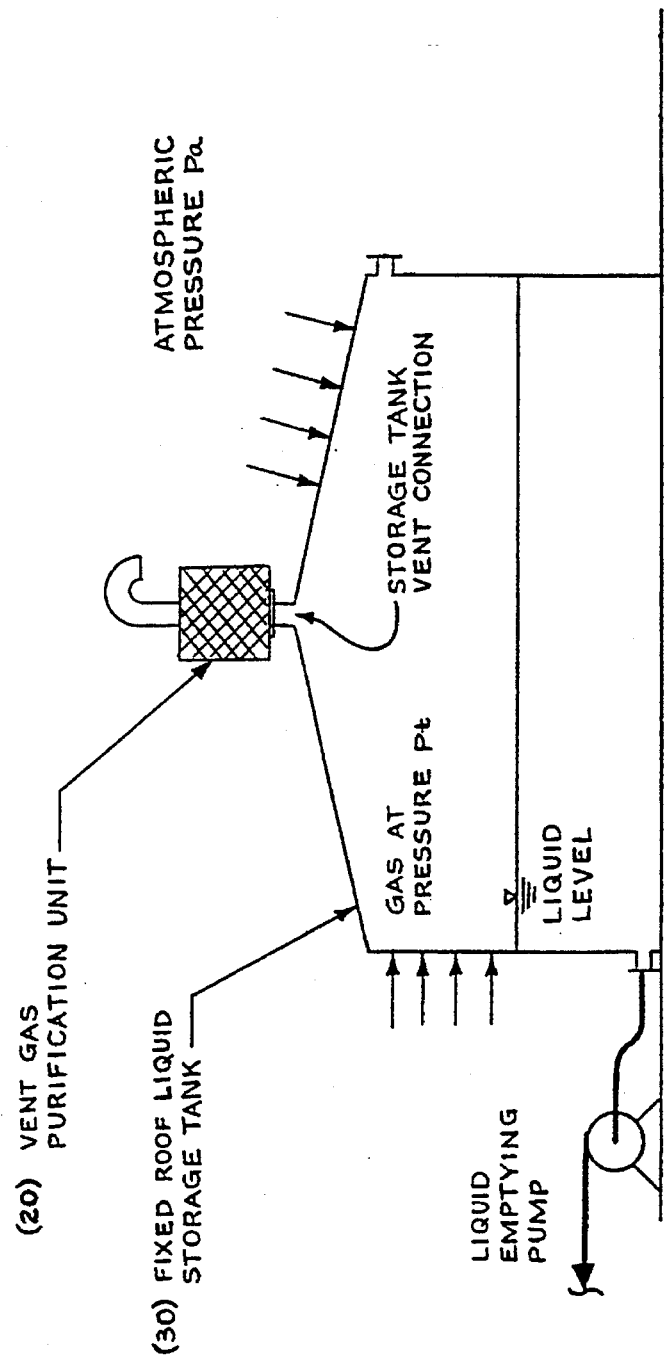
FIG. 2 illustrates the prior art embodiment of FIG. 1 during liquid emptying of the tank.
Figure 3:
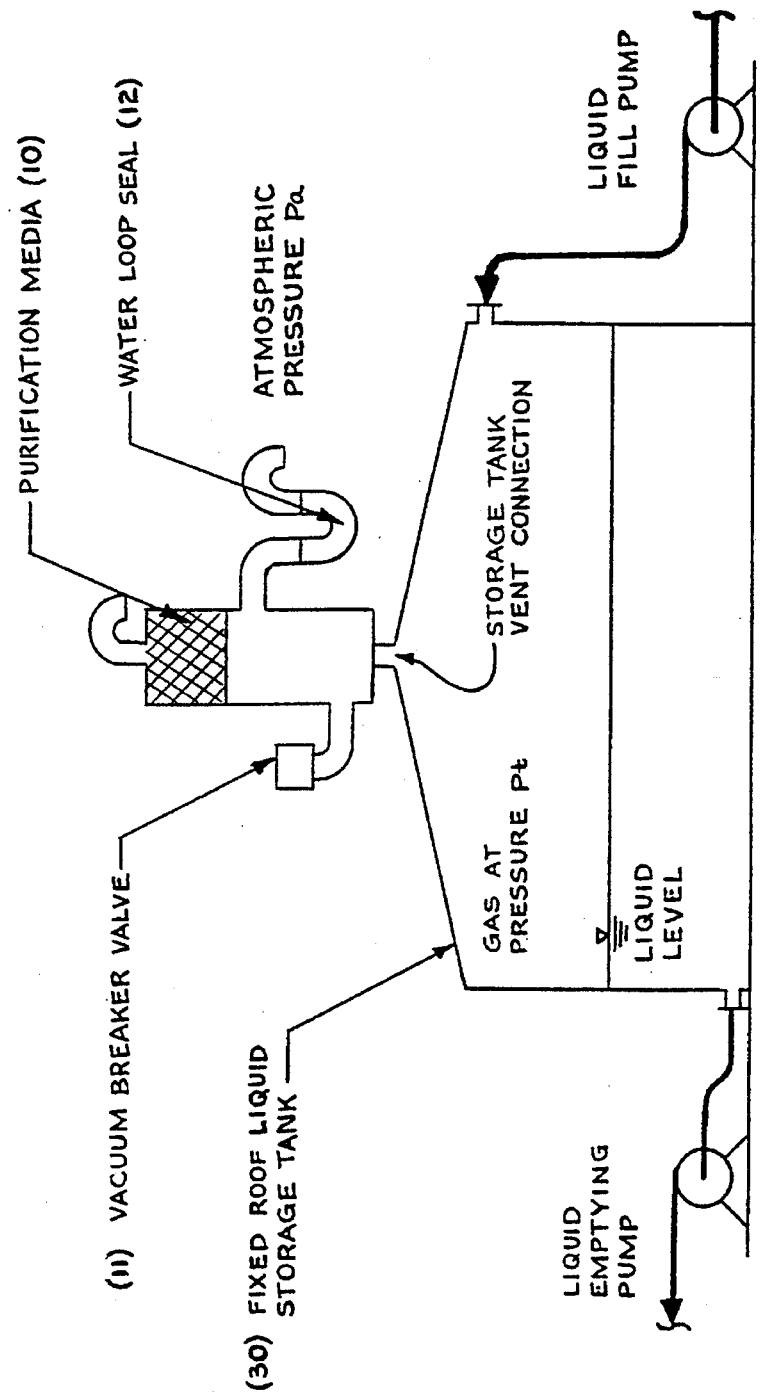
FIG. 3 illustrates another previously known purification unit attached to the gas vent of a fixed roof liquid storage tank.
Figure 4:
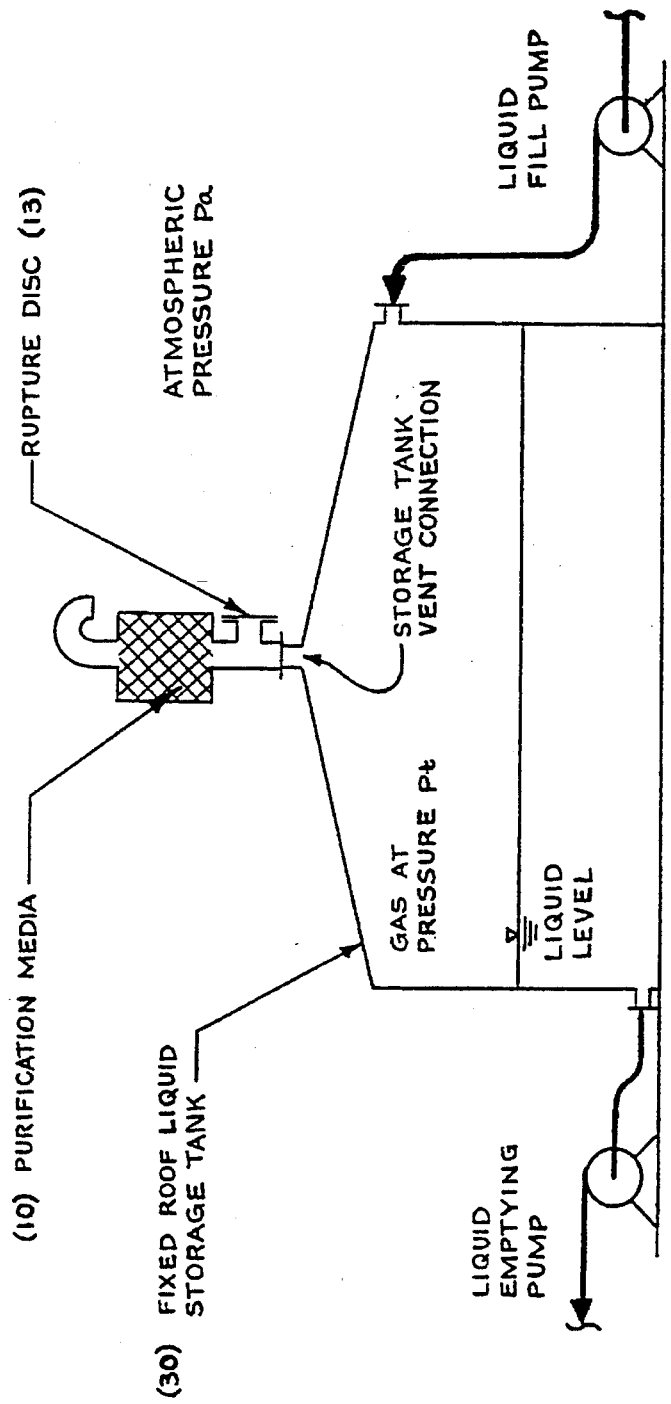
FIG. 4 illustrates yet another previously known purification unit attached to the gas vent of a fixed roof liquid storage tank.
Figure 5:
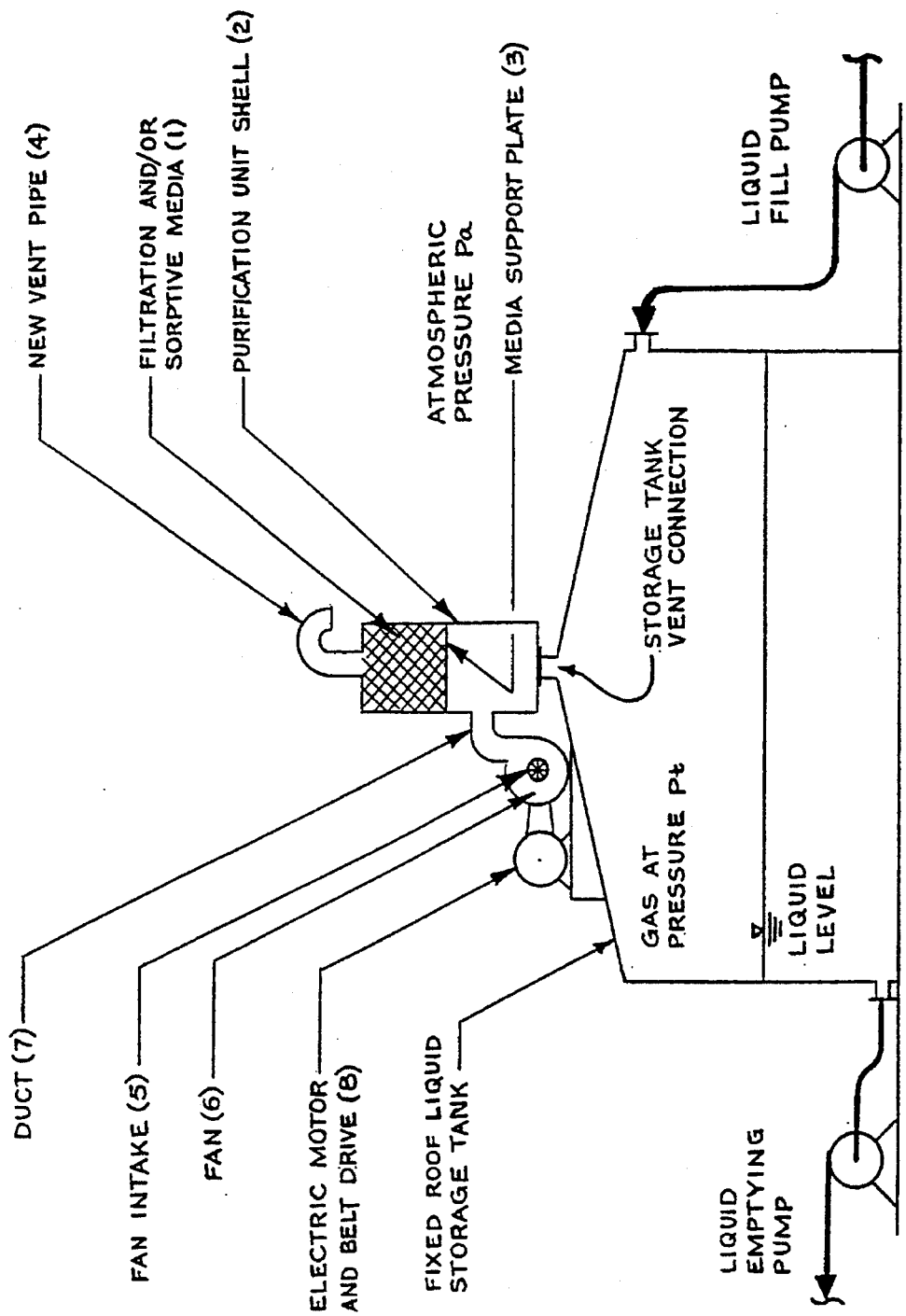
FIG. 5 illustrates a fixed roof liquid storage tank with a purification unit according to the present invention attached to the gas vent of the tank.

Referring to FIG. 5, the filtration and/or sorptive media (1) could be a bed of granular activated carbon or any other naturally occuring or synthetic sorptive media designed to remove a gaseous component, liquid droplets, or solid particles from the vented gas of a fixed roof liquid storage tank. It could also be a granular, woven, cast, or other filter media which forces vent gases through small apertures, and thereby removes solid particles or liquid droplets. It could also be a membrane which separates components from vent gases because of the difference in diffusion rates of different substances through that membrane.

The purification unit shell (2) may be constructed of steel, aluminum, fiberglass, or any number of materials; and would be designed to contain an appropriate quantity and shape of filtration and/or sorptive media (1). The purification unit shell (2) includes a media support plate (3) or any means for holding the filtration and/or sorptive media (1) in place; and it also includes a new vent pipe (4).

The fan (6) may be any of several commercially available types, including forward curved, backward curved or axial; and could be driven by an electric motor and belt drive (8), diesel engine, or any other commercially available device which will turn the fan (6). The fan (6) includes an intake (5) which is open to the atmosphere, and a duct (7) which connects it to the purification unit shell (2).

Figure 6:
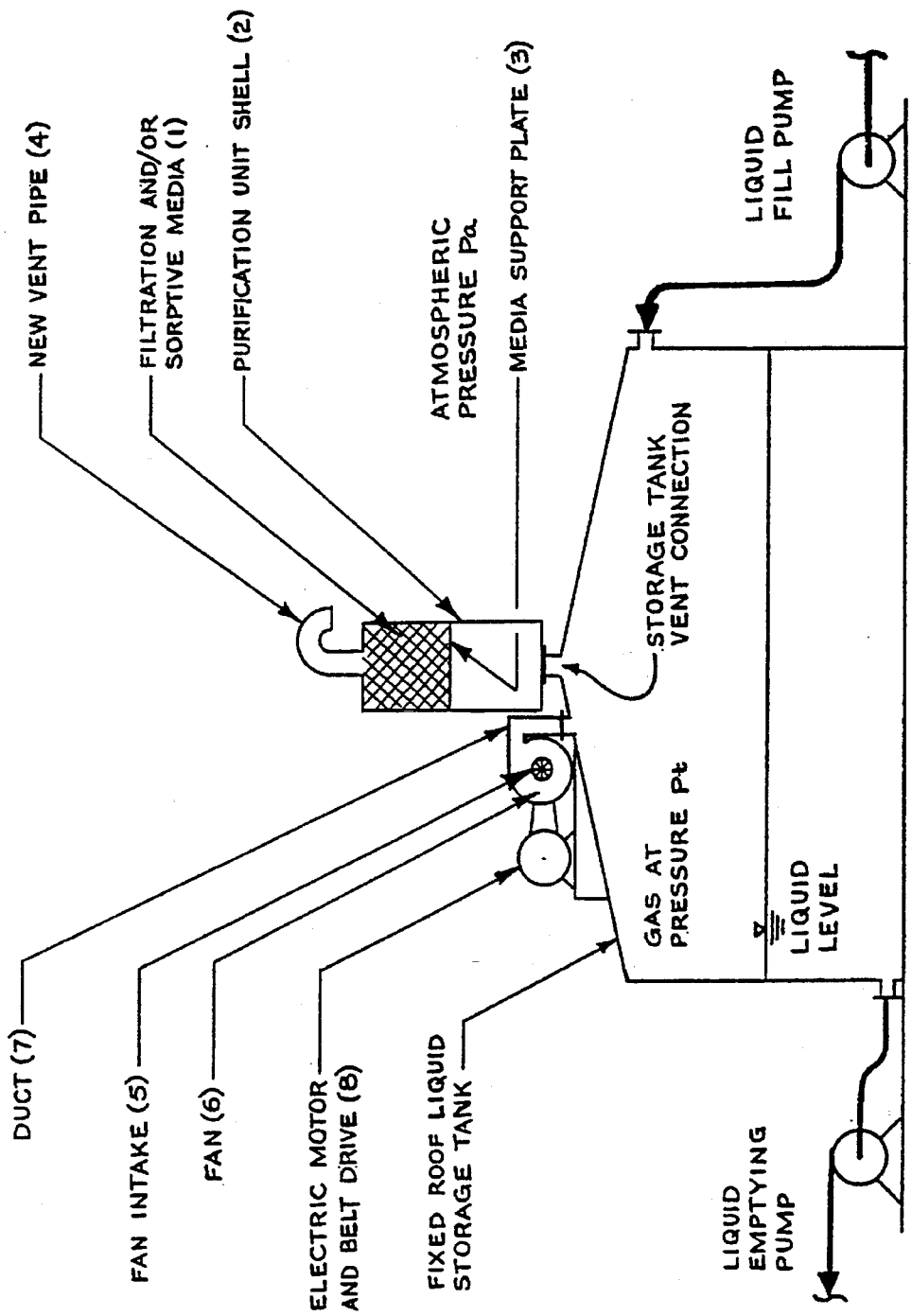
FIG. 6 illustrates a fixed roof liquid storage tank with a purification unit according to an alternative embodiment of the present invention attached to the gas vent of the tank.

FIG. 6 illustrates an alternative embodiment of the invention wherein the discharge side of the fan (6) is connected to the fixed roof liquid storage tank (30) above the liquid level and at a point other than the gas vent connection.

DESCRIPTION OF THE OPERATION OF COMPONENTS IN FIG. 5

The invented system includes two pathways through which gases may flow between the inside of a fixed roof liquid storage tank upon which it is installed and the surrounding atmosphere:

1. through the media (1) and new vent pipe (4)
2. through the fan intake (5), fan (6), and duct (7)

Because the fan generates a small positive pressure, gases from inside the storage tank are usually prevented from escaping to the surrounding atmosphere through the second of these pathways.

During normal operating conditions (when the fan (6) is working and the media (1) is not clogged), the invented system will operate as follows:

When the storage tank liquid contents are static, the fan (6) is pulling air in from the atmosphere through its intake (5) and forcing it through the media (1) and new vent pipe (4) back out to the surrounding atmosphere. Although this air does not need to be purified by the media(l), this condition does not have any adverse effect.

When liquid is being pumped out of the storage tank, the fan (6) is pulling air in from the atmosphere through its intake (5) and forcing it into space inside the storage tank which has been evacuated by liquid pumped out. At the same time, the fan (6) is forcing air through the media (1) and new vent pipe (4) back out to the surrounding atmosphere. Air flowing through the media (1) does not need to be purified, but this condition does not have any adverse effect.

When liquid is being pumped into the storage tank, the fan (6) is pulling in air from the surrounding atmosphere through its intake (5) and forcing it through the media (1) and new vent pipe (4) to the surrounding atmosphere. At the same time, gases exhausted from the storage tank vent are also forced through the media (1) and new vent pipe (4) to the surrounding atmosphere, and are thereby purified or altered by the media (1).

During all three conditions described above, the fan (6) has maintained a small positive pressure within the fixed roof liquid storage tank upon which the invented system is installed. This small positive pressure is between the upper and lower limits of pressures which can be tolerated by the fixed roof liquid storage tank.

For any number of reasons, the media (1) could at some time restrict or completely prevent gases from flowing in or out through the new vent pipe (4). If this happens, the invented system will operate as follows:

When the storage tank liquid contents are static, the fan (6) will, in effect be blowing air into a closed container, and air flowrate will be zero. The fan (6) is selected so that its discharge pressure during this condition is within the limits of tolerance of the storage tank. Although this condition may eventually damage the electric motor (8), it will not have any adverse effect on the storage tank.

When liquid is being pumped out of the storage tank, the fan (6) is pulling air in from the atmosphere through its intake (5), and forcing it through the duct (7) into space evacuated by pumped liquid inside the storage tank. In this way, a small positive pressure is maintained within the storage tank.

When liquid is being pumped into the storage tank, gases from inside the storage tank will be forced through the duct (7) and out through the fan intake (5) (in a direction which is the reverse of the fan flow direction) to the surrounding atmosphere. Although this condition may eventually damage the fan motor (8), and although gases escaping to the atmosphere are not purified, the storage tank will not be damaged. Replacement of the media (1) and fan motor (8) will correct the condition.

If the fan (6) is not operating, the invented system will operate as follows:

If the fan (6) is not operating, gases can flow between the inside of the storage tank and the surrounding atmosphere through the fan intake (5), fan (6), and duct (7). These openings are sufficiently large so that the flow of gases is not restricted appreciably more than through the storage tank vent connection by itself. In other words, this condition is the equivalent of having no purification or air pollution control device on the storage tank vent. While the fan (6) is not operating, gases will escape to the surrounding atmosphere untreated, but the storage tank will not be damaged, and only fan (6) repair is required to correct the situation.

To summarize the above, a small positive pressure which is within acceptable limits will be maintained within a fixed roof liquid storage tank upon which the invented system is installed. This will occur when components of the invented system are operating properly, and also when the fan (6) and/or the media (1) are not operating properly, insuring that a fixed roof liquid storage tank upon which the invented system is installed will not be deformed and will not collapse.

SAMPLE DESIGN CALCULATION

For this sample design calculation, the following are assumed:

that an odor control unit is to be installed on the vent line of an oil storage tank 150 feet in diameter by 32 feet high for the purpose of controlling odors caused by vented gases that the storage tank has a 12 inch diameter vent connection it has been determined that 50 cubic feet of Norit grade RB2 granular carbon will remove a sufficient quantity of the odor causing gases it has been determined that Pt (pressure within the tank) can be greater than Pa (pressure of the atmosphere) by as much as 4 inches w.c.

it has been determined that Pa cannot exceed Pt by any more than 0.01 inches w.c.

the oil storage tank will be filled at a maximum rate of 750 gpm (gallons per minute) or approximately 100 CFM (cubic feet per minute), and the maximum rate at which liquid will be pumped out of the storage tank will also be 100 CFM, and therefore Qf(flowrate of gas exhausted from the storage tank vent connection)=100

CFM and Qe(flowrate of gas which will be pulled in through the storage tank vent connection)=100 CFM By selecting a fan (6) with an intake (5), and duct (7) which each have an open area equal or greater than the existing storage tank vent connection, the difference between Pa and Pt will be controlled when the fan is not working. Gases will flow into or out of the storage tank through a passageway (storage tank vent connection-duct(7)-intake (5)) which does not restrict gas flow appreciably more than the tank vent connection by itself.

Based upon the above, a size 13 fan as determined from Industrial Air Products literature is selected. This fan has a 13⅜ inch diameter intake (dimension D), and exhausts into a 12¼ inch by 11¼ inch duct, each of which has an area greater than the existing 12 inch diameter storage tank vent.

A fan speed of 842 RPM (revolutions per minute) is selected based upon Industrial Air Products literature. This will result in a discharge or static pressure of 2 inches w.c. which is approximately halfway between the upper pressure limit of the storage tank of 4 inches w.c. and the lower limit of −0.01 inches w.c. Fan performance is described by a graph taken from the same literature . According to the literature, 100% wide open volume is RPM×4.28 or 3604 CFM. Static discharge pressure as a percentage of 2 inches w.c. can then be determined for any flowrate as a percentage of 3604 CFM.

With the above information, it is possible to evaluate conditions when the media (1) is clogged and the fan (6) is working. When there is no liquid flow into or out of the storage tank, the flowrate of air through the fan (6) will be 0 CFM or 0% of wide open volume. At this flowrate, 100% of rated static pressure will be generated or 2 inches w.c., and this pressure is within allowable limits. When the storage tank is being emptied at a rate of 100 CFM, the fan (6) flowrate will be 100 CFM. 100 CFM is approximately 2.7% of wide open volume, and according to the IAP literature, this fan (6) will generate 102% of rated static pressure or 2.04 inches w.c. This is also within allowable limits. When the storage tank is being filled with liquid at a rate of 100 CFM, this flowrate will be forced against the direction of fan (6) flow out into the atmosphere, but pressure inside the storage tank will again not exceed 2 inches w.c. by any noticable amount.

A granular activated carbon bed depth of 2 feet-6inches installed in a 5 foot diameter tank is arbitrarily selected as a media (1) configuration. With this arbitrary selection, it is possible to evaluate normal operating conditions (when the media (1) is not clogged and the fan (6) is working).

When there is no liquid flow into or out of the storage tank, the fan (6) will be taking suction from the atmosphere through its intake (5), and forcing it through the activated carbon media (1) back into the atmosphere. At a flowrate of about 220 CFM, air velocity through the activated carbon will be 11 feet per minute (220 CFM divided by 20 square feet in a 5 foot diameter tank). According to Norit literature pressure drop through grade RB2 will be about 0.8 inches w.c. per foot of bed depth, or about 2 inches w.c. total. Since this matches the IAP literature for fan performance, it can be seen that these numbers are approximately correct. The fan (6) will be forcing about 220 CFM through the activated carbon to atmosphere, and its discharge pressure (or Pt) will be about 2 inches w.c.. This is within allowable limits.

Similar to the above, when the storage tank is being emptied at a rate of 100 CFM, the fan (6) will generate a flowrate of approximately 320 CFM, with 100 CFM filling evacuated space in the storage tank, and about 220 CFM passing through the granular activated carbon media (1) out through the vent pipe (4) to atmosphere. When the storage tank is being filled with liquid at a rate of 100 CFM, the fan (6) will generate about 120 CFM; and an additional 100 CFM of gas being exhausted out of the storage tank vent connection will again generate a total gas flowrate of about 220 CFM through the granular activated carbon media (1) out to atmosphere.

Based upon the above, the difference between pressures Pt and Pa will be within acceptable limits under all possible conditions, and the components selected are suitable.

I claim:

1. A method of purifying a vent gas stream of a fixed roof liquid storage tank which will not cause deformation or collapse of the tank comprising the steps of:

connecting a purification unit which contains an enclosed chamber having first and second portions to a vent gas connection of the fixed roof liquid storage tank;

operatively positioning the second portion of the enclosed chamber between the gas vent connection and the first portion of the enclosed chamber;

providing sorptive media within the first portion of the enclosed chamber;

connecting a discharge side of a fan to the second portion of the enclosed chamber; and situating an intake side of the fan so as to be freely and completely open to the atmosphere.

2. The method of claim 1, wherein the purification unit contains filtration media.

3. The method of claim 1, wherein the purification unit contains membrane media.

4. The method of claim 1, wherein the discharge side of the fan is connected to the space inside the fixed roof liquid storage tank above the liquid level at a point other than the gas vent connection.

\* \* \* \* \*